(12) United States Patent
Chen

(10) Patent No.: US 10,002,105 B2
(45) Date of Patent: Jun. 19, 2018

(54) DISPLAY DEVICE

(71) Applicant: Wistron Corporation, New Taipei (TW)

(72) Inventor: Feng-Yuan Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 114 days.

(21) Appl. No.: 15/190,169

(22) Filed: Jun. 22, 2016

(65) Prior Publication Data

US 2017/0308498 A1    Oct. 26, 2017

(30) Foreign Application Priority Data

Apr. 26, 2016  (TW) .............................. 105112935 A

(51) Int. Cl.
*G06F 13/42* (2006.01)
*G06F 13/40* (2006.01)
*G06F 13/38* (2006.01)

(52) U.S. Cl.
CPC ........ *G06F 13/4282* (2013.01); *G06F 13/385* (2013.01); *G06F 13/4022* (2013.01)

(58) Field of Classification Search
None
See application file for complete search history.

(56) References Cited

U.S. PATENT DOCUMENTS

2009/0051622 A1*  2/2009  Yun .................. G06F 3/1431
345/2.1

FOREIGN PATENT DOCUMENTS

TW    201407359    2/2014
TW    201614635    4/2016

* cited by examiner

*Primary Examiner* — Idriss N Alrobaye
*Assistant Examiner* — Dayton Lewis-Taylor
(74) *Attorney, Agent, or Firm* — JCIPRNET

(57) ABSTRACT

A display device is provided, which includes a display panel, a controlling unit, a first universal serial bus (USB) interface, a signal configuration unit, and a second universal serial bus interface. The controlling unit controls the display panel to display an image frame according to display data. When the first USB interface is connected to an external device, the signal configuration unit receives the display data and USB data via the first USB interface, and transmits the display data to the controlling unit. The second USB interface receives the display data from the controlling unit and receives the USB data from the signal configuration unit, so as to transmit the display data and the USB data to another display device via an USB cable.

13 Claims, 7 Drawing Sheets

DISPLAY DEVICE

CROSS-REFERENCE TO RELATED APPLICATION

This application claims the priority benefit of Taiwan application serial no. 105112935, filed on Apr. 26, 2016. The entirety of the above-mentioned patent application is hereby incorporated by reference herein and made a part of this specification.

BACKGROUND OF THE INVENTION

1. Field of the Invention

The invention relates to a data transmission technique of a display device, and particularly relates to a display device compatible with daisy chain connection.

2. Description of Related Art

With the advancement of science and technology, various consumer electronic devices (e.g., mobile phones, tablet computers, notebook computers, etc.,) have become more and more popular. The transmission interfaces configured in the consumer electronic devices are expected to be compatible with multiple uses. For example, one single data transmission interface is expected to be compatible for transmission of data, image, and power at the same time. With regard to the development of universal serial bus (USB), the USB Type C interface has been developed, which is able to transmit data, image, and power at the same time, as indicated above, by using one cable.

However, since the current USB Type C interface is not compatible with the daisy chain framework that transmits image and data by using one cable at the same time, it is common in the conventional techniques to use multiple transmission cables to furnish a daisy chain framework with a plurality of display devices. In other words, the display devices are unable to transmit image and data at the same time by being connected in series through the USB Type C interface.

SUMMARY OF THE INVENTION

The invention provides a display device. The display device is connected with another display device through one transmission cable and image data and universal serial bus data are transmitted at the same time by using the transmission cable. Therefore, a host is able to transmit the image data and the universal serial bus data to a plurality of devices simultaneously based on a daisy chain of the display devices.

An embodiment of the invention provides a display device. The display device includes a display panel, a controlling unit, a first universal serial bus interface, a signal configuration unit, and a second universal serial bus interface. The display panel displays an image frame, and the controlling unit is coupled to the display panel and controls the display panel to display the image frame based on display data. The signal configuration unit is coupled to the controlling unit and the first universal serial bus interface. When the first universal serial bus interface is connected to an external device, the first universal serial bus interface receives the display data and universal serial bus data from the external device, and the signal configuration unit receives the universal serial bus data and the display data from the first universal serial bus interface and transmits the display data to the controlling unit. In addition, the second universal serial bus interface is coupled to the controlling unit and the signal configuration unit, and receives the display data from the controlling unit. Moreover, the second universal serial bus interface receives the universal serial bus data from the signal configuration unit, so as to transmit the display data and the universal serial bus data to another display device through a universal serial bus cable.

According to an embodiment of the invention, the first universal serial bus interface includes a plurality of first type channels and a plurality of second type channels, and the display device further includes an output multiplexer. The output multiplexer is coupled to the controlling unit, the second universal serial bus interface, and the signal configuration unit. The output multiplexer transmits the display data to the second universal serial bus interface. If the display data are transmitted through a portion of the first type channels of the first universal serial bus interface, the output multiplexer is switched to transmit the display data to a portion of a plurality of first type channels of the second universal serial bus interface, and transmits the universal serial bus data to another portion of the first type channels of the second universal serial bus interface.

According to an embodiment of the invention, if the display data are transmitted through all the first type channels of the first universal serial bus interface, the output multiplexer is switched to transmit the display data to all the first type channels of the second universal serial bus interface.

According to an embodiment of the invention, the signal configuration unit transmits the universal serial bus data transmitted through the second type channels of the first universal serial bus interface to the second type channels of the second universal serial bus interface.

According to an embodiment of the invention, the display device further includes a display port interface and a third universal serial bus interface. The display port interface is coupled to the controlling unit, and the third universal serial bus interface is coupled to the signal configuration unit. When the display port interface is connected to the external device and the third universal serial bus is connected to the external device, the controlling unit receives the display data from the display port interface, and the signal configuration unit receives the universal serial bus data from the third universal serial bus interface.

According to an embodiment of the invention, the signal configuration unit includes a source multiplexer and an input multiplexer. The source multiplexer is coupled to the first universal serial bus interface, the second universal serial bus interface, and the third universal serial bus interface. The input multiplexer is coupled to the controlling unit and coupled between the source multiplexer and the first universal serial bus interface. When the display device is connected to the external device through the first universal serial bus interface, the source multiplexer is switched to connect the first universal serial bus interface and the second universal serial bus interface, and the input multiplexer receives the display data from a plurality of first type channels of the first universal serial bus interface and transmits the display data to the controlling unit.

According to an embodiment of the invention, if the display data are transmitted through a portion of the first type channels of the first universal serial bus interface, the input multiplexer is switched to transmit the display data to the controlling unit and transmits the universal serial bus data transmitted through another portion of the first type channels of the first universal serial bus interface to the source multiplexer.

According to an embodiment of the invention, when the display device is connected to the external device through the third universal serial bus interface and the display port interface, the source multiplexer is switched to connect the third universal serial bus interface and the second universal serial bus interface.

According to an embodiment of the invention, the signal configuration unit further includes a universal serial bus hub. The display device further includes a fourth universal serial bus interface. The universal serial bus hub is coupled between the source multiplexer and the second universal serial bus interface. The fourth universal serial bus interface is coupled to the universal serial bus hub to receive the display data and the universal serial bus data.

According to an embodiment of the invention, the first universal serial bus interface includes a first universal serial bus port and a first interface controller. The first universal serial bus port is coupled to the signal configuration unit to transmit the display data and the universal serial bus data to the signal configuration unit. The first interface controller is coupled to the first universal serial bus port and controls an operation of the first universal serial bus port. The first interface controller notifies the controlling unit of the number of channels configured for transmitting the display data based on a display channel requirement of the external device, such that the controlling unit controls the signal configuration unit based on the number of channels configured for transmitting the display data.

According to an embodiment of the invention, the second universal serial bus interface includes a second universal serial bus port and a second interface controller. The second universal serial bus port is coupled to the signal configuration unit to transmit the display data and the universal serial bus data to the another display device. The second interface controller is coupled to the second universal serial bus port, controls an operation of the second universal serial bus port, and coordinates with the another display device on the number of channels configured for transmitting the display data.

According to an embodiment of the invention, the first universal serial bus interface and the second universal serial bus interface are compatible with the Universal Serial Bus Type-C Interface.

Another embodiment of the invention provides a display device including a display panel, a controlling unit, a first transmission interface, a second transmission interface, and a signal configuration unit. The display panel displays an image frame. The controlling unit is coupled to the display panel and controls the display panel to display the image frame based on display data. The first transmission interface receives universal serial bus data from an external device. The second transmission interface transmits the display data and the universal serial bus data to another external device. The signal configuration unit is coupled to the controlling unit, the first transmission interface, and the second transmission interface, receives the universal serial bus data from the first transmission interface, and transmits the universal serial bus data to the second transmission interface. When the display data are transmitted from the external device to the first transmission interface, the signal configuration unit receives the display data from the first transmission interface and transmits the display data to the controlling unit, and the controlling unit transmits the display data to the second transmission interface.

According to an embodiment of the invention, the display device further includes a third transmission interface. The third transmission interface is coupled to the controlling unit, and when the display data are transmitted from the external device to the third transmission interface, the controlling unit receives the display data from the third transmission interface and transmits the display data to the second transmission interface.

According to an embodiment of the invention, the signal configuration unit includes a source multiplexer and an input multiplexer. The source multiplexer is coupled to the first transmission interface and the second transmission interface. The input multiplexer is coupled to the controlling unit and coupled between the source multiplexer and the first transmission interface. In addition, the source multiplexer is switched to connect the first transmission interface and the second transmission interface, and the input multiplexer receives the display data from a plurality of first type channels of the first transmission interface and transmits the display data to the controlling unit.

According to an embodiment of the invention, the signal configuration unit includes a source multiplexer and a hub. The source multiplexer is coupled to the first transmission interface and the second transmission interface. The hub is coupled between the source multiplexer and the second transmission interface, receives the universal serial bus data from the first transmission interface, and transmits the universal serial bus data to the second transmission interface.

Based on the above, the display device according to the embodiments of the invention receives the display data and the universal serial bus data from the external device through the first universal serial bus interface, and transmits the display data and the universal serial bus data to another display device through the second universal serial bus interface by using one universal serial bus cable. Thus, based on the design of the embodiments of the invention, multiple display devices are able to be connected in series to form a daisy chain connection framework, and the host is consequently able to broadcast the display data and the universal serial bus data to the display devices.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
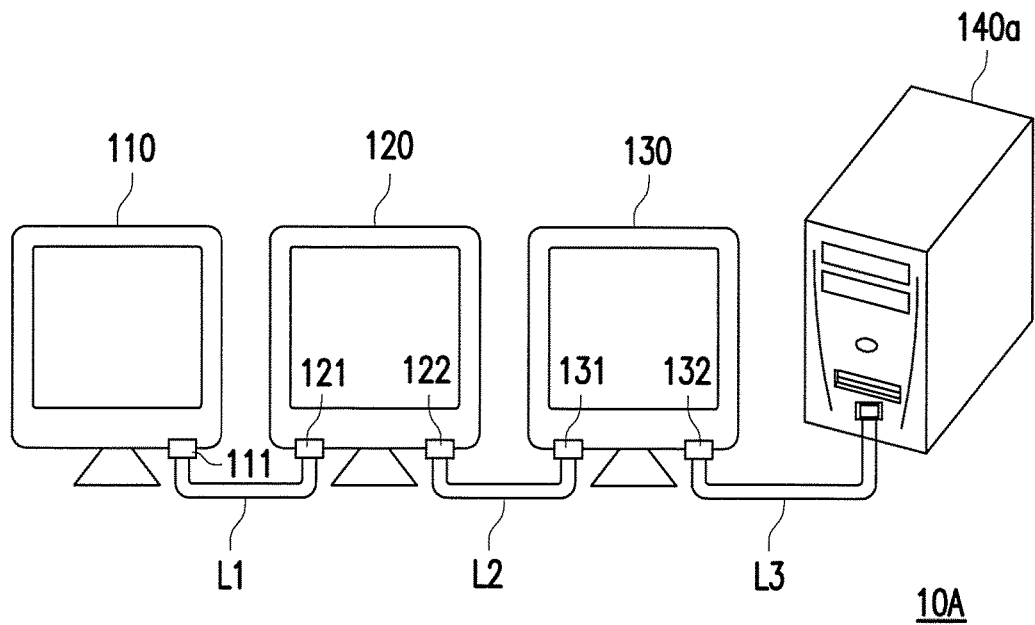
FIG. 1A is a view illustrating a daisy chain connection framework according to an embodiment of the invention where display devices are connected in series based on a universal serial bus interface.

Reference will now be made in detail to the present preferred embodiments of the invention, examples of which are illustrated in the accompanying drawings. Wherever possible, the same reference numbers are used in the drawings and the description to refer to the same or like parts.

To satisfy both the needs for image transmission and data transmission while considering the compatibility and not increasing additional cost, the invention provides a display device capable of transmitting display data compatible with the DisplayPort (DP) standard and universal serial bus (USB) data at the same time to another display device by only using one USB cable, thereby allowing a host to transmit the display data and the USB data to a plurality of display devices through a daisy link of the display devices. In order to make the content of the invention more comprehensible, embodiments are described below as the examples to prove that the invention can actually be realized.

FIG. 1A is a view illustrating a daisy chain connection framework according to an embodiment of the invention where display devices are connected in series based on a universal serial bus interface. Referring to FIG. 1A, a daisy chain connection framework 10A is formed by serially connecting a display device 110, a display device 120, a display device 130, and a host 140a. An USB interface 111 of the display device 110 is connected to an USB interface 121 of the display device 120 through a USB cable L1, an USB interface 122 of the display device 120 is connected to an USB interface 131 of the display device 130 via an USB cable L2, and an USB interface 132 of the display device 130 is connected to the host 140a via an USB cable L3. Thus, data transmitted by the host 140a may be sequentially received by the display device 110, the display device 120, and the display device 130.

In this embodiment, the USB interfaces 111, 121, 122, 131, and 132 are compatible with the USB Type-C interface, and transmit data under the USB 3.1 standard. The USB Type-C interface is a data transmission interface capable of transmitting display data meeting the DP standard and USB data meeting the USB standard at the same time. However, it should be understood that the invention is not limited thereto. Those using this embodiment may choose to apply a different data transmission standard to the embodiments of the invention, as long as such data transmission standard is capable of transmitting display data and USB data at the same time and has two or more transmission channels.

In this way, the display device 110, the display device 120, and the display device 130 may receive the display data and the USB data transmitted by the host 140a. For example, the display device 120 may receive the display data and the USB data transmitted by the host 140a from the display device 130, and the display device 110 may also receive the display data and the USB data transmitted by the host 140a from the display device 120. Moreover, it should be noted that, in the embodiments of the invention, it only requires one USB cable to transmit image and data between two display devices.

Figure 1B:
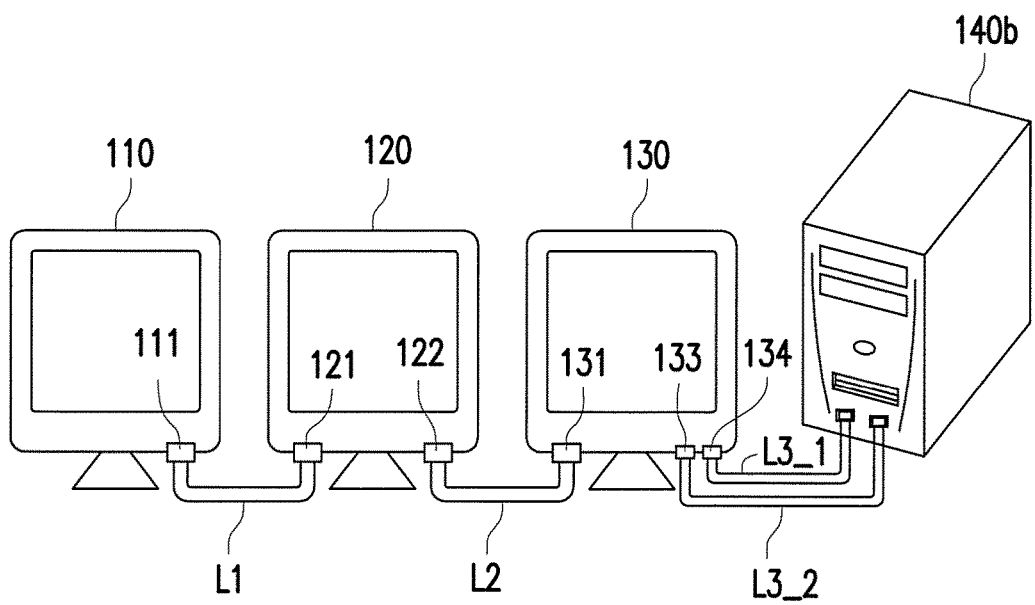
FIG. 1B is a view illustrating a daisy chain connection framework according to an embodiment of the invention where display devices are connected in series based on a universal serial bus interface.

FIG. 1B is a view illustrating a daisy chain connection framework according to an embodiment of the invention where display devices are connected in series based on a universal serial bus interface. Referring to FIG. 1B, a host 140b of a daisy chain connection framework 10B does not have a data transmission interface capable of transmitting display data and USB data at the same time. However, the host 140b may transmit the display data and the USB data through a display port interface 134 and an USB interface 133 respectively. The host 140b transmits the display data to the display device 130 through a transmission cable L3_1 and transmits the USB data to the display device 130 through a transmission cable L3_2. In addition, similar to the daisy chain connection framework 10 shown in FIG. 1A, the display device 130, the display device 120, and the display device 110 may be connected in series through the USB cables L1 and L2. In this way, the host 140b of the daisy chain connection framework 10B may transmit the display data and the USB data to the display device 130, the display device 120, and the display device 110 at the same time.

Also, it should be noted herein that the display device 110, the display device 120, and the display device 130 receive the display data and the USB data from an external device. The "external device" here refers to a provider of the image data and the USB data, and may be one of the display devices or the host in the daisy chain connection framework. For example, for the display device 130, the external device is the host 140a or the host 140b. For the display device 120, the external device is the display device 130.

Figure 2:
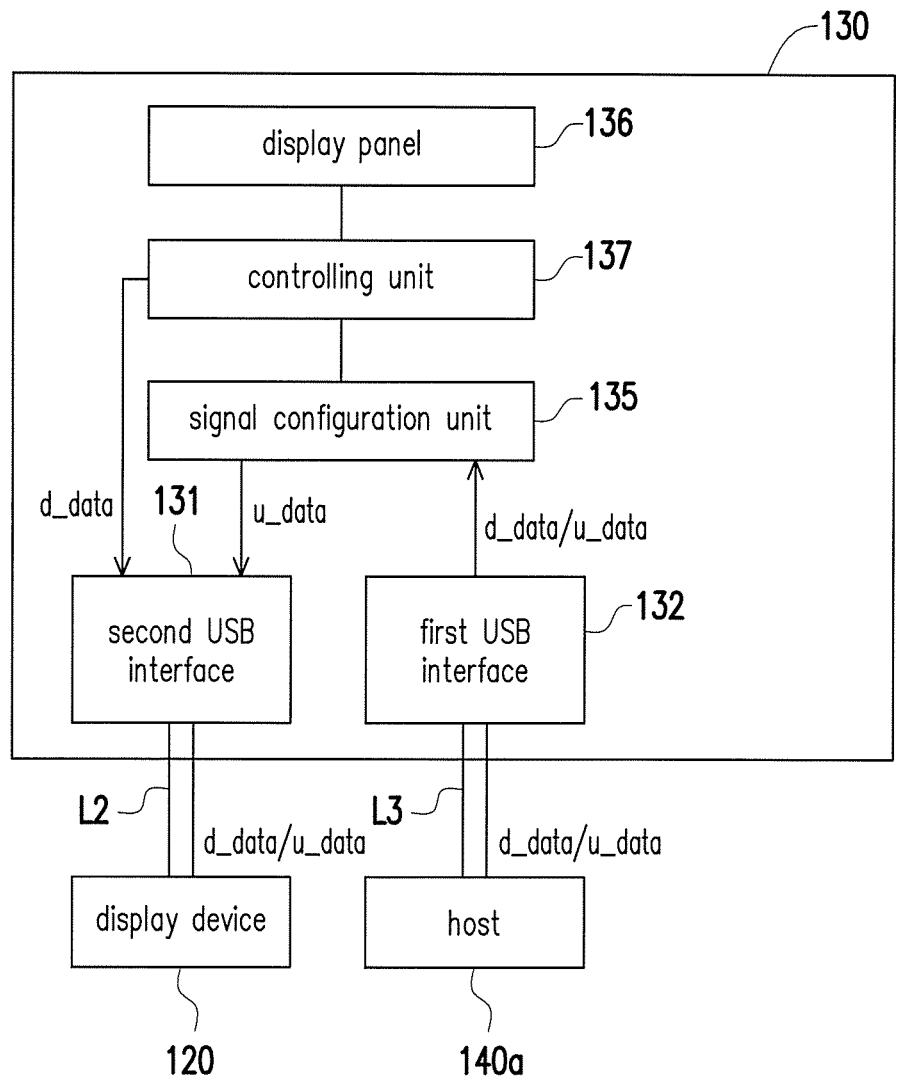
FIG. 2 is a block view illustrating a display device according to an embodiment of the invention.

FIG. 2 is a block view illustrating a display device according to an embodiment of the invention. In the following, the display device 130 is used as an example to further describe how the display device according to the embodiments of the invention carries out image transmission and data transmission at the same time with the external device and another display device. People having ordinary skills in the art may learn how the display device 110 and the display device 120 transmit data based on the descriptions about the display device 130.

Referring to FIG. 2, the display device 130 receives display data d_data and USB data u_data from the host 140a through the USB cable L3. The display device 130 includes a display panel 136, a controlling unit 137, a first USB interface 132, a signal configuration unit 135, and a second USB interface 131. The display panel 136 is configured to display an image frame, and is, for example, a liquid crystal display, a light emitting diode display, an organic light emitting diode display, or a projector-type display. The controlling unit 137 is coupled to the display panel 136 and controls the display panel 136 to display an image frame based on the display data d_data. The controlling unit 137 may be a timing controller or a scalar in a display device, or may be a specialized chip or firmware specifically designated to carry out the embodiments of the invention.

The signal configuration unit 135 is coupled to the controlling unit 137 and the first USB interface 132, and may include circuit components such as a multiplexer, a hub, etc., so as to determine transmission paths of the display data d_data and the USB data u_data. When the first USB interface 132 is connected to the host 140a, the first USB interface 132 receives the display data d_data and the USB data u_data from the host 140a. In addition, the signal configuration unit 135 receives the USB data u_data and the display data d_data from the first USB interface 132, and the signal configuration unit 135 transmits the display data d_data to the controlling unit 137. The second USB interface 131 is coupled to the controlling unit 137 and the signal configuration unit 135, and receives the display data d_data from the controlling unit 137. The second USB interface 131 receives the USB data u_data from the signal configuration unit 135, and transmits the display data d_data and the USB data u_data to another display device 120 through the USB cable L2.

Figure 3:
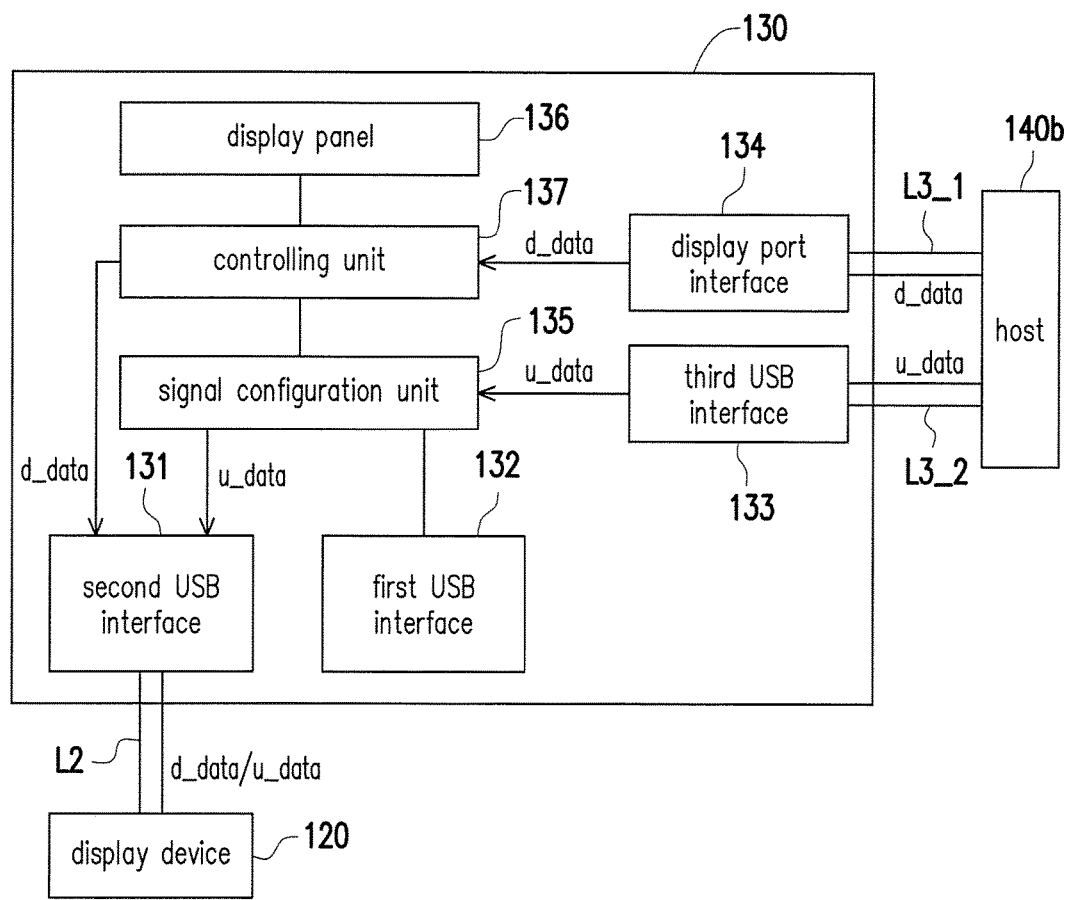
FIG. 3 is a block view illustrating a display device according to an embodiment of the invention.

FIG. 3 is a block view illustrating a display device according to an embodiment of the invention. Referring to FIG. 3, the display device 130 includes the display panel 136, the controlling unit 137, the first USB interface 132, the signal configuration unit 135, and the second USB interface 131. Functions and coupling relations of the display panel 136, the controlling unit 137, the first USB interface 132, the signal configuration unit 135, and the second USB interface 131 shown in FIG. 3 are similar to those in FIG. 2. Thus, details in these respects will not be repeated in the following. It should be noted that the display device 130 shown in FIG. 3 further includes a display port interface 134 and a third USB interface 133. The display port interface 134 is coupled to the controlling unit 137, and the third USB interface 133 is coupled to the signal configuration unit 135.

In addition, what differs from FIG. 2 is that the display device 130 shown in FIG. 3 receives the display data d_data from the host 140b through the transmission cable L3_1, and receives the USB data u_data from the host 140b through the transmission cable L3_2. When the display port interface 134 is connected to the host 140b and the third USB interface 133 is connected to the host 140b, the controlling unit 137 receives the display data d_data through the display port interface 134, and the signal configuration unit 135 receives the USB data u_data from the third USB interface 133. Thus, the second USB interface 131 may receive the display data d_data from the controlling unit 137 and receive the USB data u_data from the signal configuration unit 135, so as to transmit the display data d_data and the USB data u_data to the display device 120 at the same time.

However, it should be noted that the exact implementation of the invention may be modified based on practical needs. For example, in an embodiment of the invention, the signal configuration unit may further adjust the data transmission paths based on the number of channels configured for transmitting the display data in addition to adjusting the transmission paths based on the type of the transmission interface connected to the external device. Details in this respect are described in the following.

Figure 4:
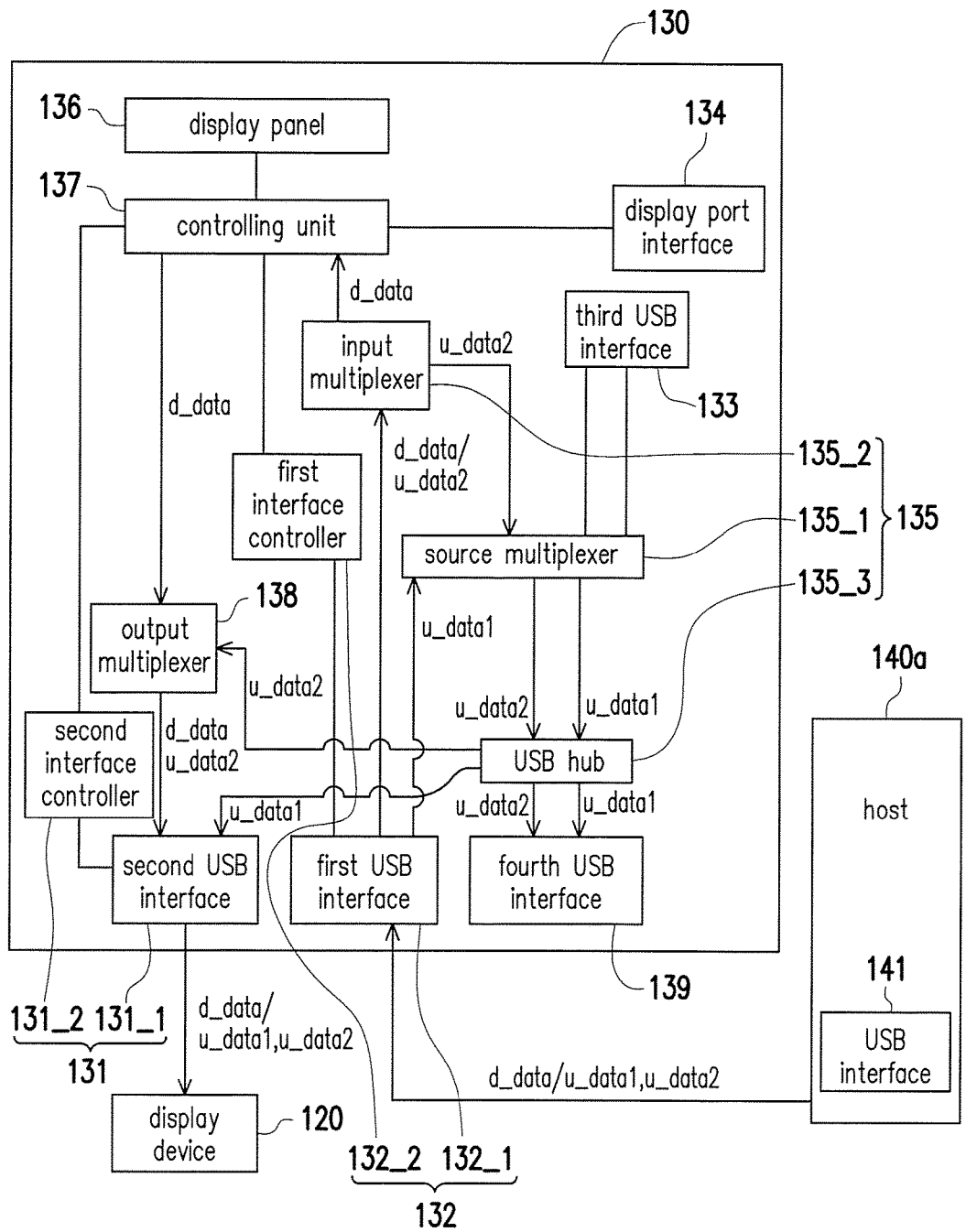
FIG. 4 is a block view illustrating a display device according to an embodiment of the invention.

FIG. 4 is a block view illustrating a display device according to an embodiment of the invention. Referring to FIG. 4, the display device 130 of FIG. 4 includes the first USB interface 132, the second USB interface 131, the third USB interface 133, the display port interface 134, the signal configuration unit 135, the display panel 136, the controlling unit 137, an output multiplexer 138, and a fourth USB interface 139.

In this embodiment, the first USB interface 132 includes a first USB port 132_1 and a first interface controller 132_2. The second USB interface 131 includes a second USB port 131_1 and a second interface controller 131_2. The first USB port 132_1 and the second USB port 131_1 may include a USB connector supporting the USB standard. The first interface controller 132_2 is configured to control an operation of the first USB port 132_1, and the second interface controller 1312 is configured to control an operation of the second USB port 131_1. Each of the first interface controller 132_2 and the second interface controller 131_2 may be implemented as a micro-processor, for example. However, the invention is not limited thereto.

It should be noted that the first USB interface 132 has a plurality of first type channels and a plurality of second type channels supporting the USB standard.

Similarly, the second USB interface 131 also has a plurality of first type channels and a plurality of second type channels supporting the USB standard. Here, the "first type channel" refers to a data channel having the capability of transmitting the display data and the USB data, and the "second type channel" refers to a data channel having the capability of transmitting the USB data. Taking the USB 3.1 Type-C interface standard as an example, the USB 3.1 Type-C interface has four superspeed data channels and two highspeed data channels compatible with USB 2.0. In other words, in the case that the first USB interface 132 and the second USB interface 131 are compatible with the USB 3.1 Type-C interface standard, for example, the first type channel may be the superspeed channel capable of transmitting the display data and the USB data, and the second type channel is the highspeed data channel compatible with USB 2.0 (i.e., D+ data channel and D− data channel).

The first USB port 132_1 is coupled to the signal configuration unit 135, so as to transmit the display data d_data and USB data u_data1 and u_data2 to the signal configuration unit 135. The second USB port 131_1 is coupled to the signal configuration unit 135, and transmits the display data d_data and the USB data u_data1 and u_data2 to another display device 120. It should be noted that the USB data u_data1 are USB data transmitted through the second type channel and the USB data u_data2 are USB data transmitted through the first type channel.

Since the host 140a may use all or a portion of the first type channels to transmit the display data, the signal configuration unit 135 may adjust the data transmission paths based on the number of channels of the first type channels configured for transmitting the display data. Hence, the remaining first type channels not configured for transmitting the display data may be used to transmit the USB data. Moreover, the output multiplexer 138 may also adjust the data transmission paths based on the number of channels of the first type channels configured for transmitting the display data.

Here, the signal configuration unit 135 includes a source multiplexer 135_1, an input multiplexer 1352, and an USB hub 135_3. The source multiplexer 135_1 is coupled to the first USB port 132_1 of the first USB interface 132 and the third USB interface 133. The input multiplexer 135_2 is coupled to the controlling unit 137, and is coupled between the source multiplexer 135_1 and the first USB port 132_1 of the first USB interface 132. The USB hub 135_3 is coupled between the source multiplexer 135_1 and the second USB port 131_1 of the second USB interface 131. In addition, the output multiplexer 138 is coupled to the controlling unit 137, the second USB interface 131, and the USB hub 135_3 of the signal configuration unit 135.

In the following, FIG. 4 is described with an example where the display device 130 is connected to the host 140a through the first USB interface 132. When the display device 130 is connected to a USB interface 141 of the host 140a through the first USB interface 132, the source multiplexer 135_1 is switched to connect a transmission path between the first USB interface 132 and the second USB interface 131. The input multiplexer 135_2 receives the display data d_data from the first type channels of the first USB interface 132, and transmits the display data d_data to the controlling unit 137.

In addition, if the display data d_data are transmitted through a portion of the first type channels of the first USB interface 132, the input multiplexer 135_2 is switched to transmit the display data d_data to the controlling unit 137, and transmits the USB data u_data2 transmitted through another portion of the first type channels of the first USB interface 132 to the source multiplexer 135_1. Taking the USB 3.1 Type-C interface as an example, when the display data d_data are transmitted through a pair of the first type channels, the USB data u_data2 are transmitted through another pair of the first type channels. The input multiplexer 135_2 is switched to output the display data d_data transmitted through the two channels to the controlling unit 137, and transmits the USB data u_data2 transmitted through another two channels to the source multiplexer 135_1.

The source multiplexer 135_1 of the signal configuration unit 135 transmits the USB data u_data1 transmitted through the second type channels of the first USB interface 132 to the second type channels of the second USB interface 131. In this embodiment, if the display data d_data are transmitted through a portion of the first type channels of the first USB interface 132, the source multiplexer 135_1 may receive the USB data u_data1 transmitted through the first type channels and the USB data u_data2 transmitted through the second type channels at the same time, and output the USB data u_data1 and the USB data u_data2 to the USB hub 135_3. The USB hub 135_3 may output the USB data u_data1 and the USB data u_data2 to the fourth USB interface 139. In addition, the USB hub 135_3 may output the USB data u_data1 to the second USB hub 131_1, and output the USB data u_data2 to the output multiplexer 138.

When the input multiplexer 135_2 transmits the display data d_data to the controlling unit 137, the controlling unit 137 outputs the display data d_data to the output multiplexer 138. If the display data d_data are transmitted through a portion of the first type channels of the first USB interface 132, the output multiplexer 138 receives the display data d_data and the USB data u_data2, and outputs the display data d_data and the USB data u_data2 to the second USB port 131_1. Specifically, if the display data d_data are transmitted through a portion of the first type channels of the first USB interface 132, the output multiplexer 138 is switched to transmit the display data d_data to a portion of the first type channels of the second USB interface 131, and transmits the USB data u_data2 to another portion of the first type channels of the second USB interface 131. Thus, the second USB port 131_1 may transmit the display data d_data, the USB data u_data1, and the USB data u_data2 to another display device 120.

If the display data d_data are transmitted through all the first type channels of the first USB interface 132, the input multiplexer 135_2 is switched to transmit the display data d_data to the controlling unit 137. In addition, the output multiplexer 138 is switched to transmit the display data d_data to all the first type channels of the second USB interface 131. More specifically, in the case that the display data d_data are transmitted through all the first type channels, the USB data u_data2 shown in FIG. 4 are absent as all the first type channels are configured to transmit the display data. Taking the USB 3.1 Type-C interface as an example, when the display data d_data are transmitted through two pairs of first type channels, the input multiplexer 135_2 is switched to output the display data d_data transmitted through four channels to the controlling unit 137, and the source multiplexer 135_1 and the output multiplexer 138 do not receive the USB data u_data2.

Figure 5:
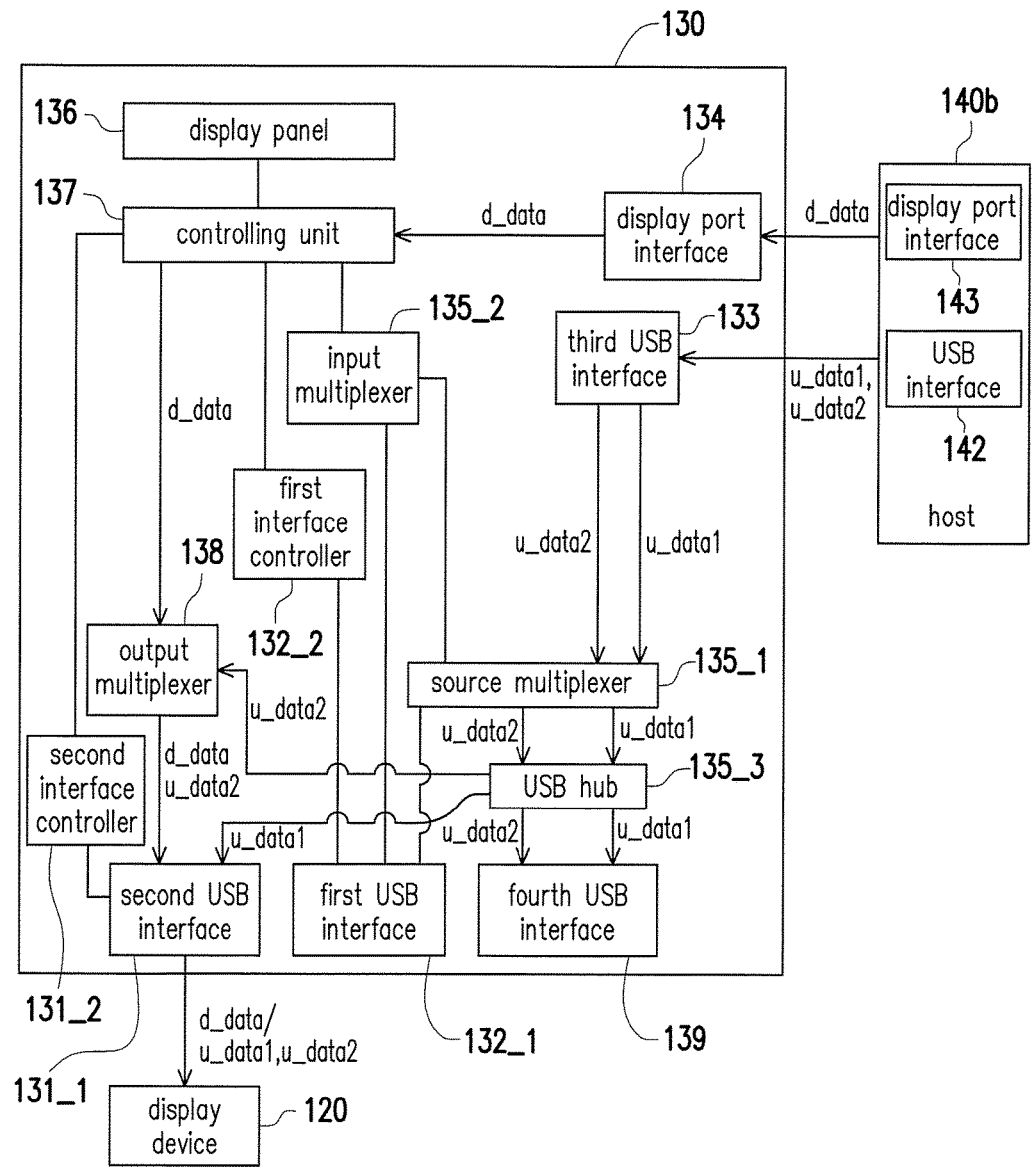
FIG. 5 is a block view illustrating a display device according to an embodiment of the invention.

FIG. 5 is a block view illustrating a display device according to an embodiment of the invention. Functions and coupling relations of components shown in FIG. 5 are similar to those of FIG. 4. However, FIG. 5 is described with an example where the display device 130 is connected to the host 140b through the third USB interface 133 and the display port interface 134.

When the display device 130 is connected to an USB interface 142 and a display port interface 143 of the host 140b through the third USB interface 133 and the display port interface 134, the display device 130 receives the display data d_data through the display port 134 and receives the USB data u_data1 or the USB data u_data2 through the third USB interface 133. Similarly, the USB data u_data1 here are data transmitted to the second type channels in the USB standard, and the USB data u_data2 are data transmitted to the first type channels in the USB standard.

When the display device 130 is connected to the host 140b through the third USB interface 133 and the display port 134, the source multiplexer 135_1 is switched to connect a transmission path between the third USB interface 133 and the second USB interface 131. Thus, the third USB interface 133 transmits the USB data u_data2 transmitted through another portion of the first type channels and the USB data u_data1 transmitted through the second type channels to the source multiplexer 135_1. The source multiplexer 135_1 outputs the USB data u_data1 and the USB data u_data2 to the USB hub 135_3. The USB hub 135_3 directly transmits the USB data u_data1 to the second USB port 131_1, and directly transmits the USB data u_data2 to the output multiplexer 138.

The display data d_data are transmitted to the output multiplexer 138 through the controlling unit 137. Thus, the output multiplexer 138 is switched to output the display data d_data and the USB data u_data2 to the second USB port 131_1. Hence, the second USB port 131_1 may transmit the display data d_data, the USB data u_data1, and the USB data u_data2 to another display device 120.

In the case that the display data d_data are transmitted through all the first type channels of the third USB interface 133, the USB data u_data2 shown in FIG. 5 are absent as all the first type channels are configured to transmit the display data. Therefore, the output multiplexer 138 is switched to transmit the display data d_data to all the first type channels of the second USB interface 131, and the USB data u_data1 are transmitted to the second type channels of the second USB interface 131.

Based on the descriptions of FIGS. 4 and 5, it can be learned that switching state of the input multiplexer 135_2 and the output multiplexer 138 may be set in response to the number of channels of the first type channels configured for transmitting the display data d_data. In addition, switching state of the source multiplexer 135_1 is set in response to whether the external device provides the display data d_data through the first USB port 132_1 or provides the display data d_data through the display port interface 134.

Figure 6:
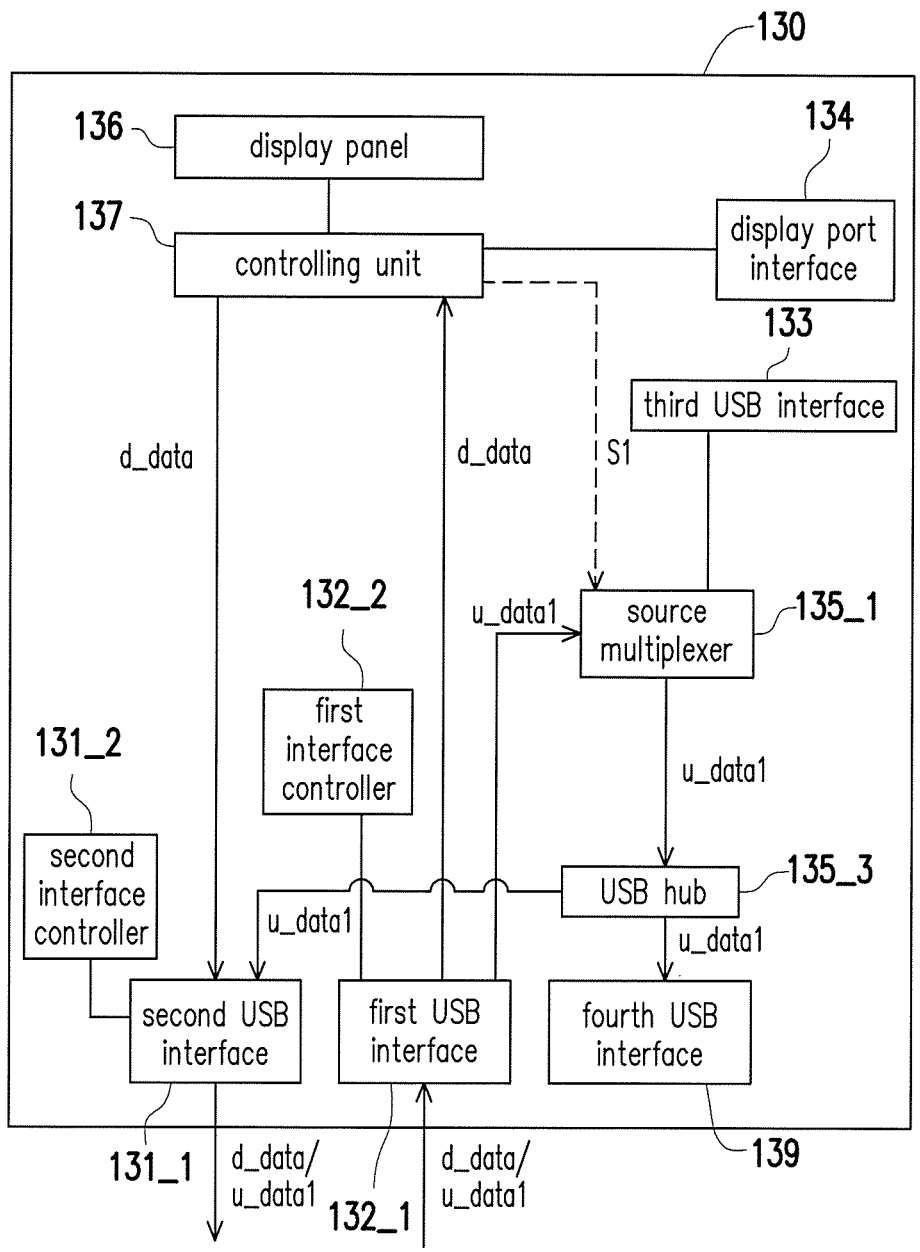
FIG. 6 is a block view illustrating a display device according to an embodiment of the invention.

Based on the above, assuming that all the first type channels of the first USB interface 132 are set in default to exclusively transmit the display data, setting of the input multiplexer 135_2 and the output multiplexer 138 is optional. FIG. 6 is a block view illustrating a display device according to an embodiment of the invention. Referring to FIG. 6, the signal configuration unit 135 of the display device 130 includes the source multiplexer 135_1 and the USB hub 135_3. Compared with the embodiment shown in FIG. 4, in the case that the display data d_data are transmitted through all the first type channels, the first USB port 132_1 in FIG. 6 only receives the USB data u_data1 transmitted through the second type channels. In addition, the first USB port 132_1 may directly transmit the display data to the controlling unit 137, and transmit the USB data u_ data1 to the source multiplexer 135_1. The controlling unit 137 may control the display panel 136 to display an image frame based on the display data d_data, and directly transmit the display data d_data to the second USB port 131_1. The USB data u_data1 are transmitted to the second USB port 131_1 through the USB hub 135_3. Thus, the USB hub 135_3 may only be compatible with the USB transmission standard having the second type channels (e.g., D+ data channel and D− data channel) only.

It should be noted that, in the embodiments of FIGS. 4 and 5, switching state of the input multiplexer 135_2, the output multiplexer 138, and the source multiplexer 135_1 are controlled by the controlling unit 137. In other words, the controlling unit 137 may send a command signal to control switching of the input multiplexer 135_2, the output multiplexer 138, and the source multiplexer 135_1. Taking FIG. 6 as an example, the controlling unit 137 may send a command signal S1 to the source multiplexer 135_1, so that the source multiplexer 135_1 is switched based on the command signal S1.

In addition, referring to FIGS. 4 and 5 again, the first interface controller 132_2 notifies the controlling unit 137 of the number of channels configured to transmit the display data based on a display channel requirement of the external device, so that the controlling unit 137 controls the signal configuration unit 135 based on the number of channels for transmitting the display data d_data. Specifically, the first interface controller 132_2 may detect whether the host 140a is connected to the display device 130 through the first USB port 132_1. The first interface controller 132_2 may further coordinate with the host 140a on the number of channels for transmitting the display data. Taking the USB 3.1 Type-C interface as an example, the first interface controller 132_2 may coordinate on how to use respective pins and data transmission channels through a configuration channel of the first USB port 132_1. When the first interface controller 132_2 and the host 140a finish the coordination, the first interface controller 132_2 may notify the controlling unit 137 that the host 140a is connected to the first USB port 132_1 and the number of channels configured for transmitting the display data d_data. In this way, the controlling unit 137 may send a command signal to configure switching of the input multiplexer 135_2, the output multiplexer 138, and the source multiplexer 135_1. In addition, the controlling unit 137 may further notify the second interface controller 131_2 of the number of channels configured for transmitting the display data d_data, so that the second interface controller 131_2 may coordinate with an interface controller of another display device 120 on the number of channels configured for transmitting the display data d_data.

Figure 7:
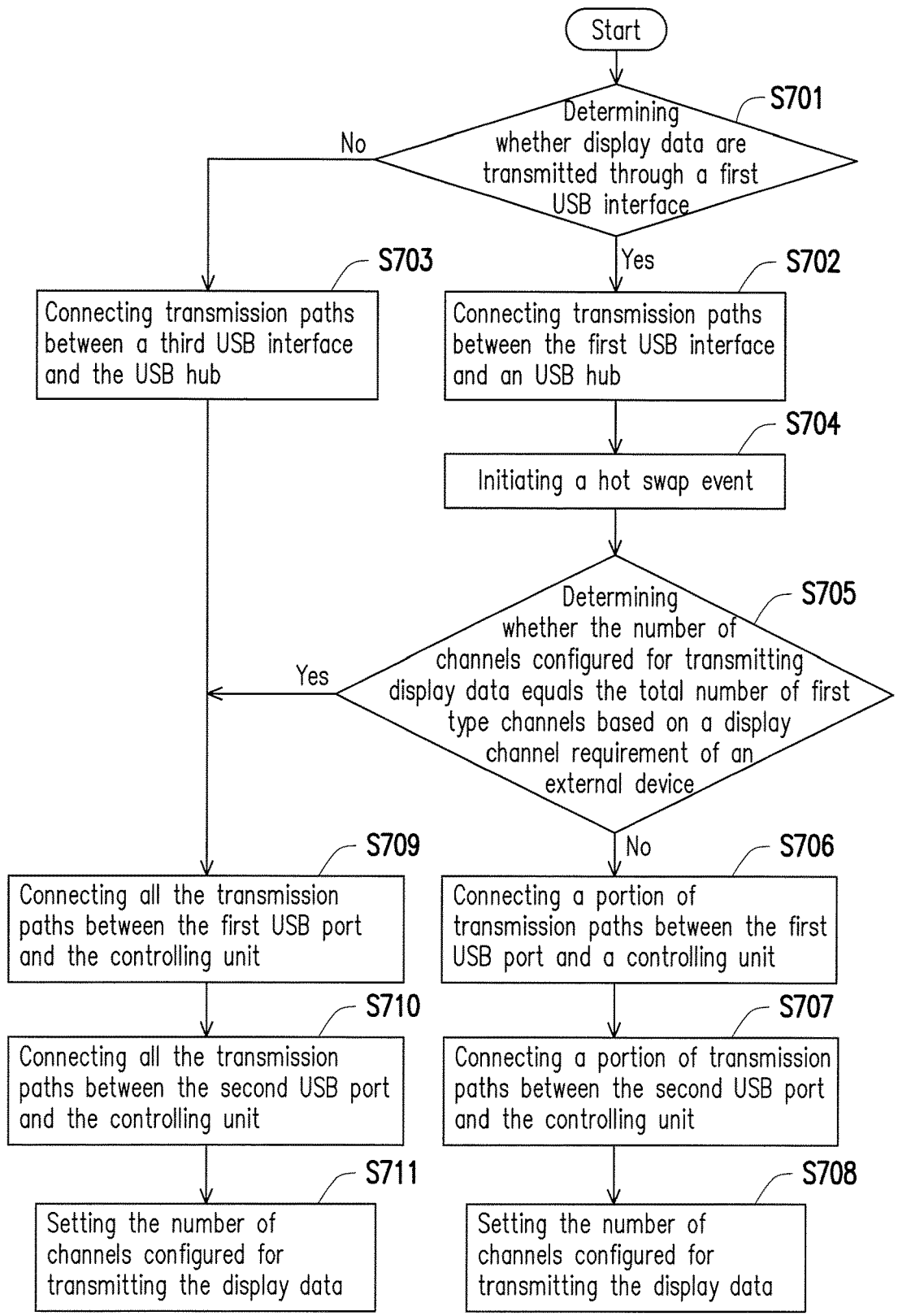
FIG. 7 is a flowchart illustrating configuring data transmission channels for display devices according to an embodiment of the invention.

FIG. 7 is a flowchart illustrating configuring data transmission channels for display devices according to an embodiment of the invention. Referring to FIGS. 4, 5, and 6 together, at Step S701, the controlling unit 137 determines whether the display data d_data are transmitted through the first USB interface 132. If it is determined that the display data d_data are transmitted through the first USB interface 132 at Step S701, the source multiplexer 135_1 connects transmission paths between the first USB interface 132 and the USB hub 135_3 at Step S702. If it is determined that the display data d_data are not transmitted through the first USB interface 133 at Step S701, the source multiplexer 135_1 connects transmission paths between the third USB interface 133 and the USB hub 135_3 at Step S703. At Step S704, the first interface controller 132_2 initiates a hot swap event. However, the hot swap event is configured to trigger the first interface controller 132 and the external device to perform interface setting before data transmission, and the invention is not limited thereto. It is within the scope of the invention as long as a process or an event triggers the first interface controller 132_2 and the external device to perform interface setting before data transmission. Thus, at Step S705, the first interface controller 132_2 determines whether the number of channels configured for transmitting the display data d_data equals the total number of the first type channels based on the display channel requirement of the external device.

If it is determined that the number of channels for transmitting the display data d_data does not equal the total number of the first type channels, the input multiplexer 135_2 is switched to connect a portion of transmission paths between the first USB port 132 and the controlling unit 137 at Step S706. At Step S707, the output multiplexer 138 is switched to connect a portion of the transmission paths between the second USB port 131 and the controlling unit 137. At Step S708, the second interface controller 131_2 sets the number of channels configured for transmitting the display data d_data.

If it is determined that the number of channels for transmitting the display data d_data equals the total number of the first type channels, the input multiplexer 135_2 is switched to connect all the transmission paths between the first USB port 132_1 and the controlling unit 137 at Step S709. At Step S710, the output multiplexer 138 is switched to connect all the transmission paths between the second USB port 131 and the controlling unit 137. At Step S711, the second interface controller 131_2 sets the number of channels configured for transmitting the display data d_data.

In view of the foregoing, the display device according to the embodiments of the invention receives the display data and the USB data from the external device through the first USB interface, and transmits the display data and the USB data to another display device through the second USB interface by using one USB cable. Thus, based on the design of the embodiments of the invention, multiple display devices are able to be connected in series to form a daisy chain connection framework, and the host is consequently able to broadcast the display data and the USB data to the display devices. In addition, the display device according to the embodiments of the invention is able to dynamically configure the number of channels for transmitting the display data based on the display channel requirement. Therefore, the transmission performance of the universal serial bus interface is able to be enhanced effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display device, comprising:
  a display panel, displaying an image frame;
  a controlling unit, coupled to the display panel and controlling the display panel to display the image frame based on display data;
  a first universal serial bus interface;

a signal configuration unit, coupled to the controlling unit and the first universal serial bus interface, wherein when the first universal serial bus interface is connected to an external device, the first universal serial bus interface receives the display data and universal serial bus data from the external device, and the signal configuration unit receives the universal serial bus data and the display data from the first universal serial bus interface and transmits the display data to the controlling unit; and a second universal serial bus interface, coupled to the controlling unit and the signal configuration unit, receiving the display data from the controlling unit, and receiving the universal serial bus data from the signal configuration unit, so as to transmit the display data and the universal serial bus data to another display device through a universal serial bus cable, wherein the first universal serial bus interface comprises a plurality of first type channels and a plurality of second type channels, and the display device further comprises:

an output multiplexer, coupled to the controlling unit, the second universal serial bus interface, and the signal configuration unit, and transmitting the display data to the second universal serial bus interface, wherein if the display data are transmitted through a portion of the first type channels of the first universal serial bus interface, the output multiplexer is switched to transmit the display data to a portion of a plurality of first type channels of the second universal serial bus interface, and transmits the universal serial bus data to another portion of the first type channels of the second universal serial bus interface.

2. The display device as claimed in claim 1, wherein if the display data are transmitted through all the first type channels of the first universal serial bus interface, the output multiplexer is switched to transmit the display data to all the first type channels of the second universal serial bus interface.

3. The display device as claimed in claim 1, wherein the signal configuration unit transmits the universal serial bus data transmitted through the second type channels of the first universal serial bus interface to the second type channels of the second universal serial bus interface.

4. The display device as claimed in claim 1, further comprising:

a display port interface, coupled to the controlling unit; and a third universal serial bus interface, coupled to the signal configuration unit, wherein when the display port interface is connected to the external device and the third universal serial bus is connected to the external device, the controlling unit receives the display data from the display port interface, and the signal configuration unit receives the universal serial bus data from the third universal serial bus interface.

5. The display device as claimed in claim 4, wherein the signal configuration unit comprises:

a source multiplexer, coupled to the first universal serial bus interface, the second universal serial bus interface, and the third universal serial bus interface; and an input multiplexer, coupled to the controlling unit and coupled between the source multiplexer and the first universal serial bus interface, wherein when the display device is connected to the external device through the first universal serial bus interface, the source multiplexer is switched to connect the first universal serial bus interface and the second universal serial bus interface, and the input multiplexer receives the display data from a plurality of first type channels of the first universal serial bus interface and transmits the display data to the controlling unit.

6. The display device as claimed in claim 5, wherein if the display data are transmitted through a portion of the first type channels of the first universal serial bus interface, the input multiplexer is switched to transmit the display data to the controlling unit and transmits the universal serial bus data transmitted through another portion of the first type channels of the first universal serial bus interface to the source multiplexer.

7. The display device as claimed in claim 5, wherein when the display device is connected to the external device through the third universal serial bus interface and the display port interface, the source multiplexer is switched to connect the third universal serial bus interface and the second universal serial bus interface.

8. The display device as claimed in claim 5, wherein the signal configuration unit further comprises:

a universal serial bus hub, coupled between the source multiplexer and the second universal serial bus interface and receiving the universal serial bus data.

9. The display device as claimed in claim 1, wherein the first universal serial bus interface comprises:

a first universal serial bus port, coupled to the signal configuration unit to transmit the display data and the universal serial bus data to the signal configuration unit; and a first interface controller, coupled to the first universal serial bus port, controlling an operation of the first universal serial bus port, and notifying the controlling unit of the number of channels configured for transmitting the display data based on a display channel requirement of the external device, such that the controlling unit controls the signal configuration unit based on the number of channels configured for transmitting the display data.

10. The display device as claimed in claim 9, wherein the second universal serial bus interface comprises:

a second universal serial bus port, coupled to the signal configuration unit to transmit the display data and the universal serial bus data to the another display device; and a second interface controller, coupled to the second universal serial bus port, controlling an operation of the second universal serial bus port, and coordinating with the another display device on the number of channels configured for transmitting the display data.

11. A display device, comprising:

a display panel, displaying an image frame;

a controlling unit, coupled to the display panel and controlling the display panel to display the image frame based on display data;

a first transmission interface, receiving universal serial bus data from an external device;

a second transmission interface, transmitting the display data and the universal serial bus data to another external device; and a signal configuration unit, coupled to the controlling unit, the first transmission interface, and the second transmission interface, receiving the universal serial bus data from the first transmission interface, and transmitting the universal serial bus data to the second transmission interface, wherein when the display data are transmitted from the external device to the first transmission interface, the signal configuration unit receives the display data from the first transmission interface and transmits the display data to the controlling unit, and the controlling unit transmits the display data to the second transmission interface, wherein the signal configuration unit comprises:
a source multiplexer, coupled to the first transmission interface and the second transmission interface; and
a hub, coupled between the source multiplexer and the second transmission interface, receiving the universal serial bus data from the first transmission interface, and transmitting the universal serial bus data to the second transmission interface.

12. The display device as claimed in claim 11, further comprising a third transmission interface coupled to the controlling unit, wherein when the display data are transmitted from the external device to the third transmission interface, the controlling unit receives the display data from the third transmission interface and transmits the display data to the second transmission interface.

13. The display device as claimed in claim 11, wherein the signal configuration unit comprises:
a source multiplexer, coupled to the first transmission interface and the second transmission interface; and
an input multiplexer, coupled to the controlling unit and coupled between the source multiplexer and the first transmission interface,
wherein the source multiplexer is switched to connect the first transmission interface and the second transmission interface, and the input multiplexer receives the display data from a plurality of first type channels of the first transmission interface and transmits the display data to the controlling unit.

* * * * *